United States Patent

Charters et al.

[15] 3,701,120

[45] Oct. 24, 1972

[54] ANALOG CAPACITOR MEMORY WITH SLOW WRITE-IN AND FAST NONDESTRUCTIVE READ-OUT

[72] Inventors: Robert L. Charters, Bellevue; James M. Bartlemay, Seattle; John M. Folline, Kent; Thomas G. Donich, Federal Way, all of Wash.

[73] Assignee: The Boeing Company, Seattle, Wash.

[22] Filed: Sept. 18, 1969

[21] Appl. No.: 862,633

[52] U.S. Cl.....................340/173 R, 307/246, 320/1, 340/173 CA

[51] Int. Cl........G11c 7/00, G11c 11/24, G11c 27/00

[58] Field of Search........340/173 R, 173 CA; 320/1; 307/246, 109

[56] References Cited

UNITED STATES PATENTS

| | | | |
|---|---|---|---|
| 3,504,350 | 3/1970 | Stone | 340/173 R |
| 3,504,352 | 3/1970 | Stromswold | 340/173 R |
| 3,550,092 | 12/1970 | Yoshimaru | 340/173 R |
| 3,404,382 | 10/1968 | Rosenheck | 340/173 R |
| 3,157,859 | 11/1964 | Moore | 340/173 CA |
| 3,504,353 | 3/1970 | Guzak | 340/173 R |
| 3,142,822 | 7/1964 | Martin | 340/173 R |
| 3,165,694 | 1/1965 | Young | 320/1 X |

*Primary Examiner*—Bernard Konick
*Assistant Examiner*—Stuart Hecker
*Attorney*—Christensen & Sanborn

[57] ABSTRACT

An analog memory capable of write-in at a relatively low rate and independent, nondestructive read-out at a relatively high rate. A single write-in and read-out address logic is provided for as memory units are desired. Each memory unit includes a matrix of sample and hold microcircuits, each having an external storage capacitor, an isolation amplifier and independent input and output analog switching in response to vertical and horizontal write-in and read-out addressing.

16 Claims, 8 Drawing Figures

INVENTORS:
ROBERT L. CHARTERS
JAMES M. BARTLEMAY
JOHN M. FOLLINE
THOMAS G. DONICH
BY
Christensen, Sanborn, & Matthews
ATTORNEYS INVENTORS:
ROBERT L. CHARTERS
JAMES M. BARTLEMAY
JOHN M. FOLLINE
THOMAS G. DONICH
BY Christensen, Sanborn & Matthews
ATTORNEYS INVENTORS:
ROBERT L. CHARTERS
JAMES M. BARTLEMAY
JOHN M. FOLLINE
THOMAS G. DONICH
BY
ATTORNEYS INVENTORS:
ROBERT L. CHARTERS
JAMES M. BARTLEMAY
JOHN M. FOLLINE
THOMAS G. DONICH
BY
ATTORNEYS INVENTORS:
ROBERT L. CHARTERS
JAMES M. BARTLEMAY
JOHN M. FOLLINE
THOMAS G. DONICH
BY
ATTORNEYS INVENTORS:
ROBERT L. CHARTERS
JAMES M. BARTLEMAY
JOHN M. FOLLINE
THOMAS G. DONICH
BY
Christensen, Sanborn & Matthews
ATTORNEYS INVENTORS:
ROBERT L. CHARTERS
JAMES M. BARTLEMAY
JOHN M. FOLLINE
THOMAS G. DONICH BY Christensen, Sanborn, & Matthews
ATTORNEYS

ANALOG CAPACITOR MEMORY WITH SLOW WRITE-IN AND FAST NONDESTRUCTIVE READ-OUT

BACKGROUND OF THE INVENTION

This invention generally relates to a memory unit suitable for use in data processing and, more particularly, to such a memory unit employing analog sampling techniques.

In sampled data operations, wherein an input analog wave form or a series of analog pulses are to be analyzed in terms of their time characteristics, analog memory devices possess a functional advantage over digital systems providing the same operation since the necessity of analog-digital and digital-analog conversion is avoided. Similarly, analog systems have long been in favor in general storage, correlation, and time compression applications. For example, in a sampled data system, an analog memory system has the capability of sampling an input wave form at a plurality of discrete intervals, storing the sampled values, and providing a near real-time read-out for processing applications. An analog system is able to provide this operation because it must store but one informational value for each sampling interval. On the other hand, since digital operations are primarily in a binary coded form, each interval value must be stored in as many bit positions as comprise the particular binary code used. Immediately, it is apparent that the storage capacity of such a digital system is greater than that of the analog system by a factor equal to the number of binary digits used in the code. Most important, to provide storage of the interval value in the same time as a corresponding analog system so that near real-time processing is available, the digital components must operate at a repetition rate greater than the repetition rate of the analog system as a factor again equal to the number of bits in the digital binary code.

In high frequency applications of such memory systems such as radar, sonar, and communication systems, this latter requirement has made it difficult to use digital systems, given the state of the art with respect to component operating speeds. In other words, present digital systems cannot provide reliable operation at the repetition rates required.

Yet, to provide an analog system with the desired degree of complexity for these applications has also been difficult. Heretofore, the prior art analog circuits were simply too complex, too large, too expensive, and too difficult to maintain to be successfully used in a large capacity memory.

It is therefore an object of this invention to provide an analog memory system which provides storage of sampled analog signals suitable for use in high frequency applications.

It is another object of this invention to provide such an analog memory system of large storage capacity which is small in size and inexpensive.

It is yet another object of this invention to provide an analog memory system which provides time compression of sampled analog signals, which samples the signals over wide dynamic ranges with extreme linearity, and which provides independent write-in and read-out of the sampled data.

SUMMARY OF THE INVENTION

Briefly stated, the present invention operates to store sampled analog data in a plurality of memory units which are controlled by a single write-in address logic and a single read-out address logic, wherein each memory unit contains a plurality of sample and hold memory cells, each memory cell having a storage capacitor and being controlled by the write-in address logic to store sampled analog data at a relatively low repetition rate and being further controlled by the read-out address logic to provide a nondestructive, independent read-out of the sampled data at a relatively high repetition rate.

DESCRIPTION OF THE DRAWINGS

The subject matter of this invention is particularly pointed out and distinctly claimed in the concluding portion of the specification. The invention both as to organization and method of operation may best be understood by reference to the following description taken in conjunction with the accompanying drawings in which:

DESCRIPTION OF A PREFERRED EMBODIMENT

Figure 1:
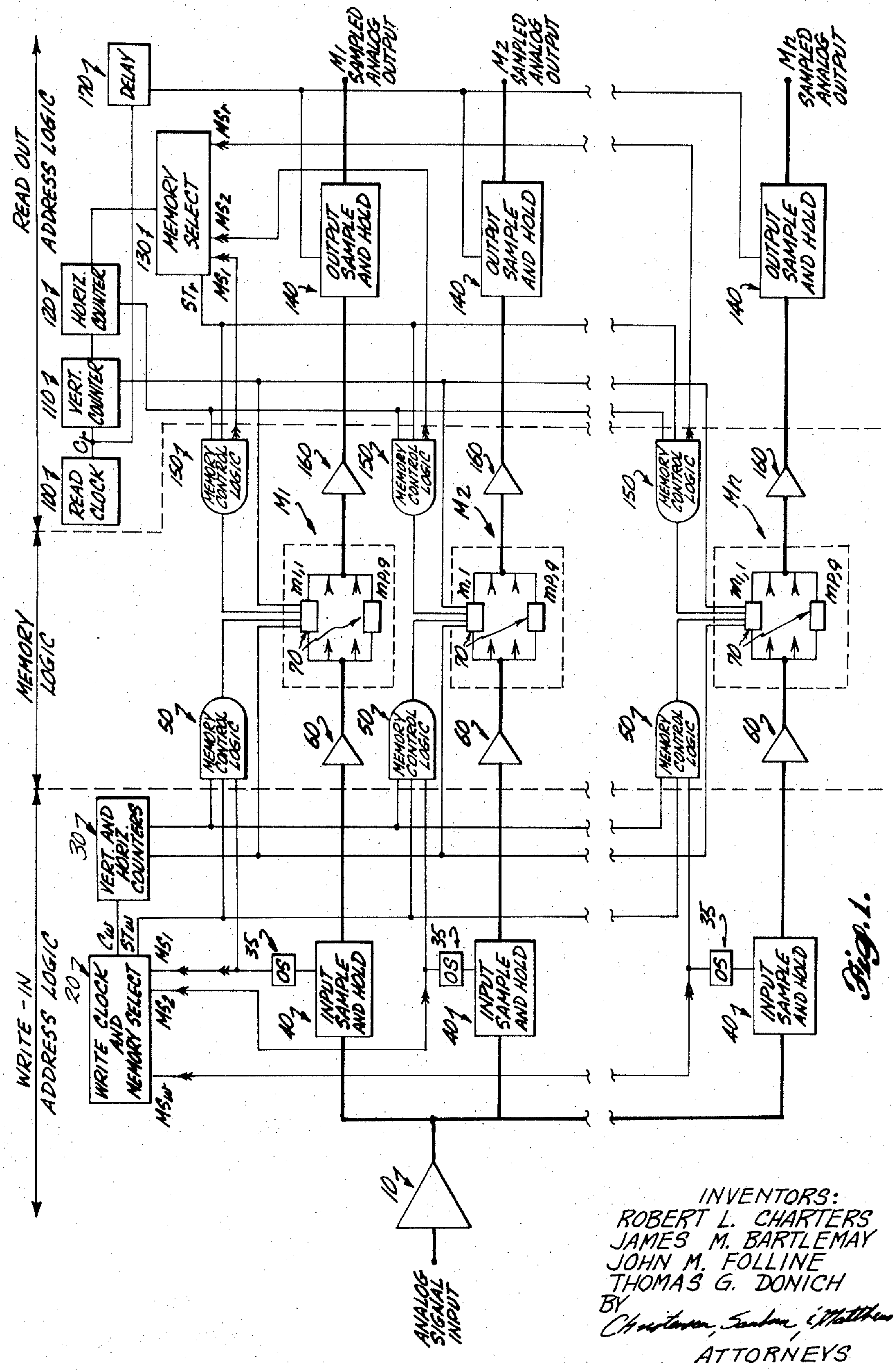
FIG. 1 is a block diagram of the electronic analog capacitor memory.

With reference to FIG. 1, the electronic analog capacitor memory of this invention can be divided into three portions: a write-in address logic portion, a memory logic portion, and a read-out address logic portion. Analog signal paths through these portions are indicated in FIG. 1 by bold lines, and address signal paths in each logic portion are indicated by the lighter lines. The analog signal which the memory is to store is applied through an input amplifier 10 to the inputs of a plurality of input sample and hold circuits 40. In FIG. 1, the memory is divided into a plurality of separate memory units $M_1$–$M_n$. The output of each sample and hold circuit 40 is applied through an amplifier 60 to each memory unit $M_1$–$M_n$, and outputs are provided from these memory units to a corresponding plurality of output sample and hold circuits 140 through a plurality of amplifiers 160. Each output sample and hold circuit 140 in turn provides an output for its corresponding memory unit, which are labeled in FIG. 1 as $M_1$ sampled analog output, $M_2$sampled analog output, . . . $M_n$ sampled analog output.

As will be noted later, input sample and hold circuits 40 and output sample and hold circuits 140 are not required for all embodiments of the capacitor memory, as they serve primarily filtering functions, and accordingly may be dispensed with under certain conditions.

Each of the memory units $M_1$–$M_n$ includes a plurality of memory cells 70 which may be arranged in a matrix of cells $m_{1,1}$ to $m_{p,q}$, where $p$ and $q$ may be any integers.

For purposes of convenience, the matrix may be thought of as comprising the elements 70 arranged in horizontal and vertical rows, where $p$ is the number of horizontal rows and $q$ is the number of vertical rows. In a preferred embodiment, each of the memory units contains an identical matrix of memory cells 70.

Figure 2:
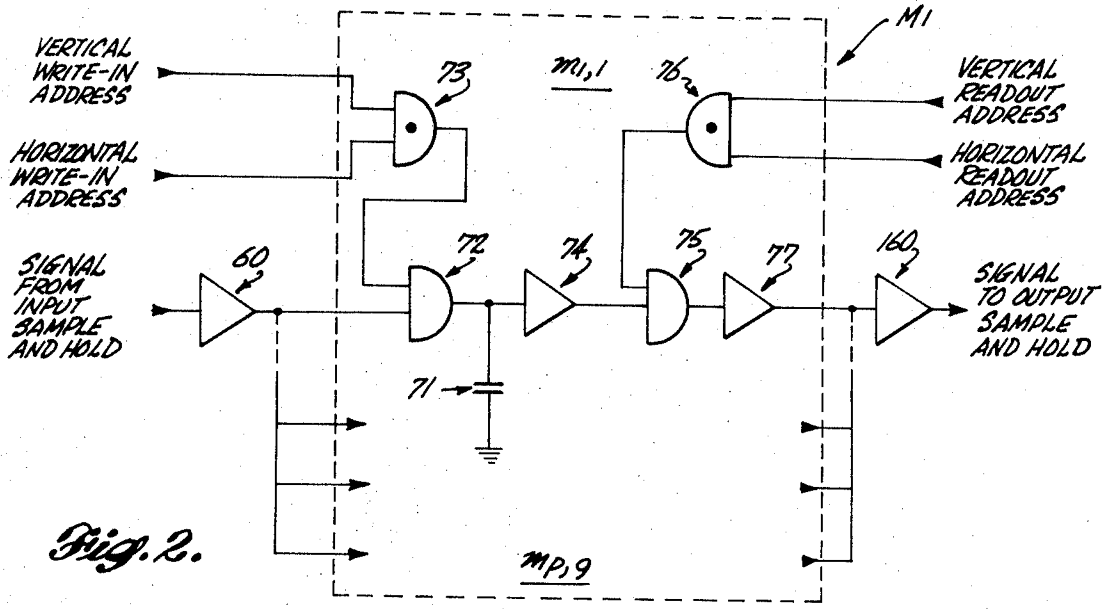
FIG. 2 is a logic diagram and FIG. 3 a schematic diagram of the sample and hold memory cell.
Figure 3:
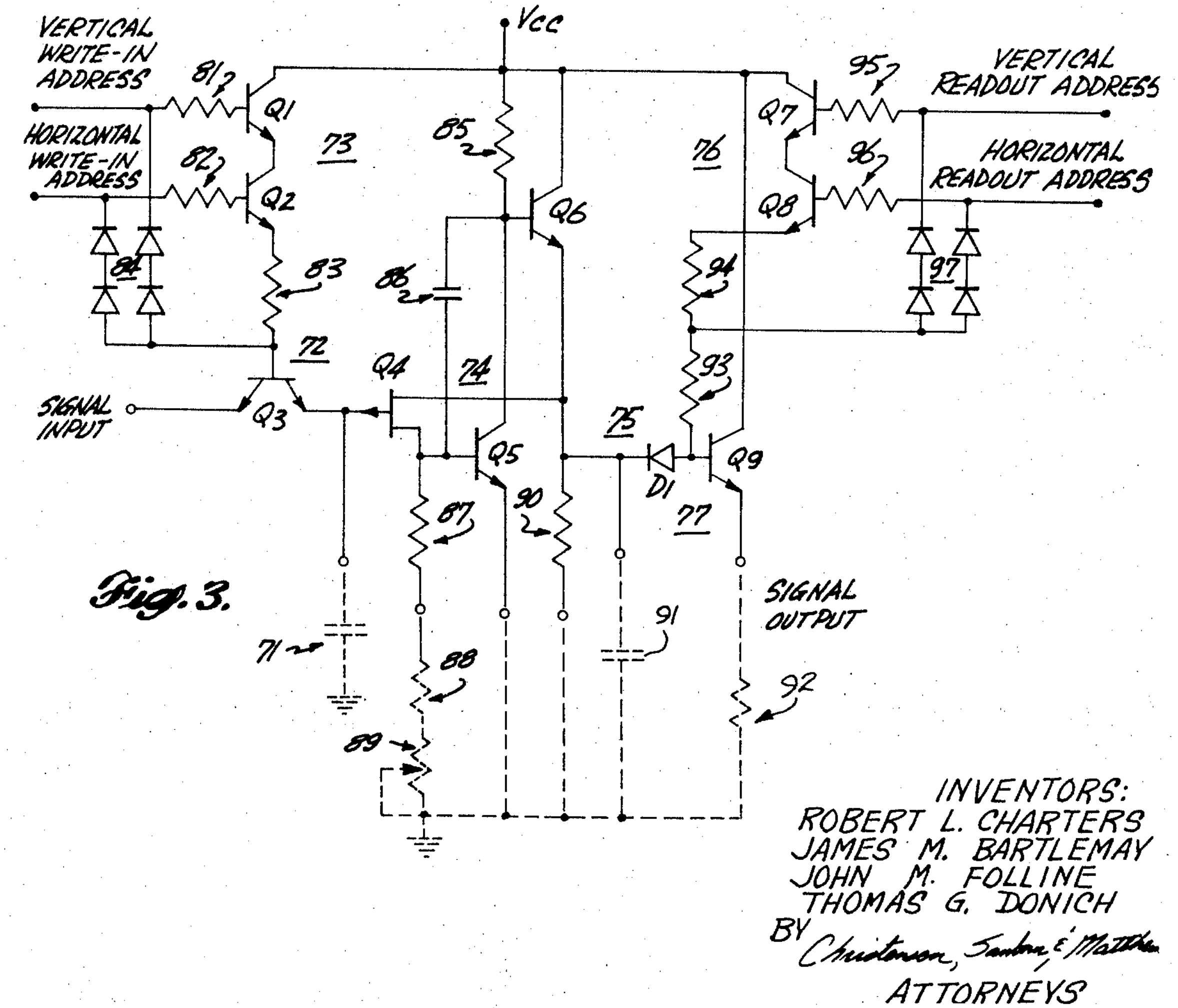

As will be noted from a brief consideration of FIGS. 2 and 3, each of the memory cells 70 has a signal input connected to input amplifier 60, a signal output connected to summing output amplifier 160, a vertical and horizontal write-in address terminal, and a vertical and horizontal read-out address terminal. Briefly, each of the cells 70 includes a storage capacitor which is connected to the input amplifier 60 when appropriate signals are present on both the vertical and horizontal write-in address terminals, and which is connected to the output amplifier 160 when appropriate signals are present on both the vertical and horizontal read-out address terminals. Accordingly, each memory cell 70 samples the analog input signal when the write-in address signals are present, holds it during any desired subsequent interval, and presents it to the output amplifier 160 in a nondestructive read-out when the read-out address signals are present.

The write-in address signals are supplied by the write-in address logic portion which includes a single write clock and memory select circuit 20, a single vertical and horizontal counter circuit 30, and a plurality of monostable multivibrators 35 associated with each input sample and hold circuit 40. An output of the vertical and horizontal counter circuit is identified with each vertical and horizontal memory cell address. Thus, the outputs of the vertical counter in circuit 30 are connected to the vertical write-in address terminals of the memory cells 70 in parallel. Only those to cells $m_{1,1}$ are shown. Interposed in the signal paths between the vertical and horizontal counter circuit 30 and horizontal write-in address terminals are a plurality of control logic circuits 50 in the memory logic portion, wherein each memory $M_1$–$M_n$ has associated therewith one of the memory control logic circuits 50.

The write-in address logic and the associated memory control logic circuits 50 provide selective control of serial write-in addressing of the memory cells 70 in memory units $M_1$–$M_n$ at a relatively low pulse repetition frequency. In the simplest mode of operation, sampling of the analog signal supplied through input amplifier 10 will proceed in the following sequence: the cell 70 in position $m_{1,1}$ will be first addressed by the write-in address signals so that the storage capacitor therein is connected to the analog input for a desired sampling interval. Next, the cell 70 in the position $m_{1,1}$ of memory unit $M_2$ will be addressed by the write-in address signals so that its storage capacitor will be connected to the analog input for a second sampling interval. In a similar fashion, all the cells 70 in position $m_{1,1}$ of memory units $M_3$–$M_n$ will be addressed for successive sampling intervals. After memory unit $M_n$ has thus been addressed, the memory cells in the next, succeeding row of each memory unit $M_1$–$M_n$ will be addressed. In the embodiment illustrated in FIG. 1, the next row addressed is the vertical, and thus all the cells 70 in position $m_{1,2}$ will be addressed in sequence during succeeding sampling intervals.

When all the vertical cells positioned in the first horizontal row have been addressed, the cycle just described is repeated by addressing in sequence the next, succeeding horizontal row. Thus, the cell 70 in position $m_{2,1}$ in memory unit $M_1$ will be addressed, then the cell 70 in position $m_{2,1}$ in memory unit $M_2$ and so forth. The write-in addressing procedure continues until each and every cell 70, each and every memory unit $M_1$–$M_n$ has been addressed. The addressing sequency may then be repeated in an identical manner or may be varied.

More complex write-in addressing sequences will be evident after a consideration of the construction and operation of the write-in address logic in more detail.

The duration of each sampling interval is determined by write clock and memory circuit 20. Circuit 20 provides write clock pulses $C_w$ to vertical and horizontal counter circuit 30. In addition, circuit 20 provides a series of pulses $ST_w$, and a plurality of sequentially occurring pulses $MS_1$–$MS_w$. These latter set of pulses may be considered as steering and memory select pulses, respectively, which are applied to the memory control logic circuits 50 to control the write-in addressing sequence.

Because of the necessity of serial addressing of the memory units $M_1$–$M_n$, the MS pulses are the highest-frequency pulses produced by circuit 20. One $ST_w$ pulse is produced for every sequential series of pulses $MS_1$–$MS_b$ $ST_w$ pulse, or, in alternate modes of operation, for various multiples of $ST_w$ pulses.

There may be any number of MS pulses produced by the write clock and memory select circuit 20 for every $ST_w$ pulse. However, the maximum number of MS pulses that can be used at any one time is equal to the number of the memory units $M_1$–$M_n$. As illustrated in FIG. 1, one MS pulse is associated with each memory $M_1$–$M_n$. Thus, since the MS pulses occur in a sequence from $MS_1$ to $MS_w$, determination of which MS pulses are associated with which memory units determines the basic sequence of write-in addressing. In FIG. 1, let it be assumed that write clock in memory select circuit 30 provides only $n$ MS pulses, one for each memory unit $M_1$–$M_n$, and that the memory units are addressed in the sequence $M_1$ to $M_n$. Accordingly, a connection is made from pulse $MS_1$ to memory control logic circuit 50 of memory unit $M_1$, and additionally to the one-shot multivibrator 35 associated therewith. Likewise, pulse $MS_2$ is connected only to memory control logic circuit 50 associated with memory unit $M_2$, and additionally to the one-shot multivibrator 35 associated therewith. Similar connections are made between the remaining MS pulses, memory control logic circuits 50 and to one-shot multivibrators 35. If a different write-in addressing sequence were desired, pulse $MS_1$ might be connected to memory unit $M_2$, pulse $MS_2$ to memory unit $M_n$, and pulse $MS_w$ to memory unit $M_1$, for instance.

The width of each MS pulse determines the basic sampling interval of the analog memory. The $ST_w$ pulses are primarily used for selection of various groups of the MS pulse sequences. In a simple embodiment, one $ST_w$ pulse is produced for every MS pulse sequence, but succeeding $ST_w$ pulses may be provided on separate connections to the memory control logic circuits 50 in a predetermined sequence. Thus, an $ST_1$ pulse will be produced on one line for a first group of MS pulses, an $ST_2$ pulse produced on a second line for a second group of MS pulses, and so forth, until an $ST_w$ pulse would appear on the last line available, in which case the next pulse would be $ST_1$ on the first line.

As noted before, a $C_w$ pulse may be produced for every $ST_w$ pulse. Vertical and horizontal counter circuit 30 may include a separate ring counter, one for the vertical rows of memory units $M_1$–$M_n$, and the other for the horizontal rows of memory $M_1$–$M_n$. In a preferred embodiment, the vertical ring counter is stepped by each $C_w$ pulse. Thus, since one $C_w$ pulse is provided for at most each group of MS pulses, the vertical counter will stay at a fixed count until all memories have been addressed in the sequence determined by the connection of the MS pulses to be memory units $M_1$–$M_n$. When the $C_w$ pulses have stepped the vertical ring counter to its final count position, the next $C_w$ pulse resets the vertical ring counter and in addition sets the horizontal ring counter to its next count position.

It should be remembered that the MS pulse associated with the particular memory unit is connected to the associated memory control logic 50, as is the $ST_w$ output from circuit 20. Each memory control logic circuit 50 is a gate, either simple or complex, which combines the MS, $ST_w$, and horizontal outputs in a predetermined manner to control the application of a horizontal write-in address signal to the memory cells 70. Thus, it may be desired that the memory unit $M_1$ be addressed during every sequence of MS pulses. Accordingly, the associated memory control logic circuit 50 will be set so that an address signal will be applied to the appropriate horizontal row, as determined by the output of the horizontal counter in circuit 30, for every $ST_w$ pulse produced, no matter on which line it appeared. On the other hand, it may be desired that memory unit $M_1$ be addressed for every fourth series of MS pulses. In this case, if the $ST_w$ pulses appeared on four distinct output connections, the memory control logic 50 associated with memory unit $M_1$ could be set to supply an address signal to the appropriate horizontal row for every $ST_w$ pulse appearing on a particular one of the four output connections, such as $ST_4$.

This addressing sequence may be further modified. If one $C_w$ pulse is produced for every two $ST_w$ pulses, and further assuming that the $ST_w$ pulses appear on two separate output connections, either of which may be chosen by appropriately controlling the memory control logics 50. Moreover, each memory control logic 50 may be set to select one of the $ST_w$ pulses and to combine it with a particular horizontal row. In such a case, each memory unit may be divided into as many sections as there are connections for the $ST_w$ pulses. Thus, when the first $ST_w$ pulse $ST_1$ appears, one half of the horizontal rows in the memories could be addressed. When the second $ST_w$ pulse $ST_1$ appears, the other half of the horizontal memory rows could be addressed.

To summarize, the sequence of the $MS_1$–$MS_w$ pulses, together with the order of their connection to the memory units $M_1$–$M_n$, determines the basic addressing sequence of those memory units and, in addition, the duration of each MS pulse determines the basic sampling interval for each memory cell 70. After the basic addressing sequence is thus determined, the vertical addressing sequence is thus determined, the vertical addressing sequence is identical for each memory unit. However, the frequency of this vertical addressing may be changed by varying the frequency of the $C_w$ clock pulses. Whether or not a particular memory cell 70 in a particular horizontal row in each matrix is actually addressed is determined by the memory control logic 50 associated with each memory unit $M_1$–$M_n$. By appropriately choosing the combination of $ST_w$, MS and horizontal outputs from the horizontal ring counter for which each memory control logic 50 will produce a horizontal address signal, an extremely large number of variations may be made from the basic addressing sequence.

If the analog signal wave form applied to the memory units $M_1$–$M_n$ through amplifier 10 has a frequency or repetition rate exceeding that of the write-in addressing rate, the input sample and hold circuits 40 are required. To insure that a discrete value of the analog wave form is present for a period of time sufficient to allow the particular storage cell 70 which is being addressed to sample and hold that value, each input sample and hold circuit 40 is gated on by the appropriate MS pulse whereby the input actually presented to the memory cell 70 is a constant analog value which persists for a time sufficient to allow addressing and write-in.

The read-out address logic portion of the analog memory has similar structure and operation, but is distinguished primarily by the desirability of much higher addressing rates and the desirability of either parallel or sequential addressing of the memory cells 70. Accordingly, the read-out address logic includes a read clock 100, a vertical counter 110, a horizontal counter 120, a memory select circuit 130, and a delay circuit 170 for use with the memory units $M_1$–$M_n$, each of which has associated therewith a memory control logic circuit 150. The basic read-out interval is provided by the clock pulses $C_r$ from read clock 100 which are applied to vertical counter 110 and to delay circuit 170. All the information contained in a single memory unit may be read out in the sequence of write-in but at a much faster repetition rate. Then all of the information stored in a second memory unit may be read out in the sequence of write-in but also at a higher repetition rate, and so forth, until all memory units have been interrogated. The sequence of addressing memories may then be repated, or varied in any desired manner. Alternatively, the memories may be read out in parallel, by simultaneously addressing the memory cells 70 of all memory units in the sequence of write-in.

Vertical counter 110 is thus stepped in response to each $C_r$ pulse from write clock 100 so that the memory cells 70 are addressed by proceeding from one vertical row to the next. When vertical counter 110 has completed its count, the next succeeding $C_r$ pulse resets it and additionally provides a set pulse to horizontal counter 120 so that the next horizontal row is addressed. Memory select circuit 130 is designed to provide a sequence of MS signals $MS_1$–$MS_r$ which may comprise any number. However, as with the write-in address memory select signals, the number of MS pulses actually used can be no greater than the number of memory units $M_1$–$M_n$. In a single embodiment as illustrated in FIG. 1, $MS_1$ is associated with memory unit $M_1$, $MS_2$ with memory unit $M_2$, and $MS_r$ with memory unit $M_n$. Memory select circuit 130 also provides an $ST_r$ pulse for each sequence of MS pulses therefrom. The $ST_r$ pulses may appear on different output connections of memory select circuit 130, as do the $ST_w$ pulses associated with write clock and memory select circuit 20, and may be used to divide each of the memory units $M_1$–$M_n$ into separate portions for read-out purposes.

If it is assumed that an $MS_1$ pulse is being produced by memory select circuit 130, that pulse will continue until the $C_r$ pulses from read clock 100 have stepped vertical counter 110 and horizontal counter 120 through its entire range, so that one of the memory units $M_1$–$M_n$ has been completely addressed during a read-out period. Memory control logic 150 is similar to memory control logic 50 in combining the $ST_r$, MS and horizontal counts to produce appropriate read-out pulses to the horizontal read-out address terminals of memory cells 70. Thus,memory control logic 150 may be responsive to each $ST_r$ pulse so that memory unit $M_1$ is completely addressed for read-out during the time interval during which the $MS_1$ pulse is provided by memory select circuit 130. Likewise, the memory control logic circuit 150 associated with memory unit $M_2$ may be set so that memory unit is completely addressed for read-out during the time interval of pulse $MS_2$. Complete read-out addressing of the memory units $M_1$–$M_n$ continues in the sequence determined by the connection of the MS outputs of memory select circuit 130 to the memory control logic circuits 150 associated therewith.

If the write-in address logic has been set, by appropriate control of each memory control logic circuit 50, to sequentially write data into separate portions of the memory units $M_1$–$M_n$, then to preserve this separation the separate portions must be separately addressed during read-out. Accordingly, memory control logic circuits 150 may be responsive to the $ST_r$ pulses appearing on only certain output connections of memory select circuit 130. Thus, if memory select circuit 130 has two separate output connections providing alternate pulses $ST_1$ and $ST_2$, each memory control logic circuit 150 may be set to respond to the $ST_1$ pulse during a first sequence of MS pulses, and to respond to the $ST_2$ pulse during a second sequence of MS pulses. In such a case, each memory control logic circuit 150 must also gate the appropriate outputs from horizontal counter 120 so that, during the first MS pulse sequence, one-half of each memory unit $M_1$–$M_n$ is addressed for read-out and, during the second MS pulse sequence, the other half of each memory unit $M_1$–$M_n$ is addressed for read-out.

If parallel read-out of the memory units $M_1$–$M_n$ is desired, memory control logic circuits 150 are simply made unresponsive to either the $ST_r$ or the MS pulses thereto.

While the output sample and hold circuits 140 are not strictly necessary for operation of the analog memory, they are helpful in eliminating distortion in each sampled analog signal due to variations in rise and fall times of the sample and hold circuits which comprise memory cells 70. A single sample and hold circuit is used for the output of each memory, and is driven by the $C_r$ pulses from read clock 100, which are shaped and positioned by a delay circuit 170. A resultant control pulse to each output sample and hold circuit 140 begins after the leading edge of the $C_r$ pulse and ends before the trailing edge thereof, so that only the analog value present on the storage capacitor of each memory cell 70 is applied to the sampled analog output terminal for that memory, and any spikes or noise caused by the operation of the memory cells 70 are blocked from the memory unit output. The noise and spikes caused by each output sample and hold circuit 140 may thus be easily detected and filtered.

The analog memory thus described is particularly useful in radar systems wherein the timing of the analog signal input is important for range measurement purposes. In such applications, the MS signals from write clock and memory select circuit 20 may define appropriate range gates by setting off definite time intervals. A zero time reference may be provided at the time of radar pulse transmittal by appropriately providing a sync pulse to circuit 20 so that the MS pulses occur at known intervals thereafter. Since the MS pulses determine into which memory units $M_1$–$M_n$ the analog return pulse is to be stored, the contents of each memory unit may thus denote a definite range. By appropriately interrogating these memory units $M_1$–$M_n$ by using the read-out address logic portion, the sampled analog outputs indicate at which range a return data pulse was obtained.

For more general applications, the analog memory is particularly useful because of its facility for time compression of the analog signal input. It should be remembered that write-in addressing proceeds at a relatively low repetition rate, but that enough samples are taken so as to insure a reasonable facsimile of the analog signal input. On the other hand, read-out addressing proceeds at a relatively high repetition rate so that the analog signal, once it is stored in the memory units $M_1$–$M_n$, may be interrogated many times before there is any significant change in the analog signal input. For example, if a sinusoidal wave form of a given frequency is present at the analog signal input, the sample analog outputs will have a similar wave shape of a much higher frequency. Moreover, the various sampled analog outputs will be phase-displaced from each other by an amount equal to the sampling interval of the write-in address logic, if parallel read-out addressing is used.

To insure correct operation of the analog memory so that may interrogations can be made of the analog signal input, the sample and hold circuits which comprise memory cells 70 must each be capable of nondestructive interrogation. In addition, it is desirable to have the memory units $M_1$–$M_n$ include as many cells as possible and, at the same time, to take up as little space as possible. Heretofore, such requirements, together with the speed needed for applications such as radar systems, were not possible. However, with the development of microcircuit techniques, it is now possible to fabricate such a memory.

Reference should be made to FIGS. 2 and 3 which relate to logical and schematic diagrams, respectively, of such a sample and hold microcircuit for memory cell $m_{1,1}$ of memory unit $M_1$.

The output of amplifier 60 is applied to an input terminal of an analog switch 72. The control input to analog switch 72 is supplied by AND gate 73 which has as its inputs the vertical write-in address signal from vertical counter 30 and the horizontal write-in address signal from memory control logic 50. The output of analog switch 72 is connected across an external storage capacitor 71 whose other terminal is connected to reference potential. Capacitor 71 is in turn connected across the input of an isolation amplifier 74 whose output is connected to one input of an output analog switch 75. The control input to analog switch 75 is furnished by an AND gate 76 which has as its inputs the vertical read-out address signal from vertical counter 110 and the horizontal read-out address signal from memory control logic 150. The output of analog switch 75 is connected through a buffer amplifier 77 to the input of amplifier 160, along with the output signals from the remaining memory cells 70 in the memory $M_1$.

In operation, analog switch 72 is normally in a blocking position so as to isolate capacitor 71 from the input amplifier 60. With the occurrence of both the vertical write-in address and horizontal write-in address signals at the inputs to AND gate 73, the output signal provided thereby switches analog switch 72 to its open position so that the analog signal appearing at the output of amplifier 60 is connected to capacitor 71 to charge that capacitor to a corresponding analog voltage. As will be noted from the previous description of the analog memory, the actual sampled value is determined by the duration of the pulse from monostable multivibrator 35 when the input sample and hold circuit 40 is used. Thus, the signal presented to storage capacitor 71 will be a D.C. voltage whose magnitude is proportional to the sampled analog value. The time during which analog switch 72 is maintained open must be sufficient to allow the storage capacitor 71 to charge to this magnitude. Generally, capacitor 71 is chosen to have a large capacitance to minimize leakage effects during any subsequent storage interval. Accordingly, the pulse width of the MS pulse applied to memory control logic 50 must be appropriately chosen to allow capacitor 71 sufficient charging time.

The function of isolation amplifier 74 is to provide a high input impedance to the storage capacitor 71 and a low output impedance to the output analog switch 75. When the signal on the control input to analog switch 72 is removed with the trailing edge of the MS pulse, and that switch closes, the charge on storage capacitor 71 is thus effectively prevented from leaking off either through analog switch 72 or isolation amplifier 74. Because of its impedance characteristics, isolation amplifier 74 also allows non-destructive read-out of the signal stored in storage capacitor 71. In such a case, the occurrence of both the vertical read-out address signal from the vertical counter 110 and the horizontal read-out address signal from memory control logic 150 provides an output signal from AND gate 76 to place analog switch 75 in its open position. AND gate 76 and analog switch 75 are designed to operate much faster than the operating time of AND gate 73 and analog switch 72 or discharge time of capacitor 71. Thus, the analog signal stored in capacitor 71 may be coupled to the output amplifier 160 through buffer amplifier 77 a large number of times to permit time compression of the analog signal supplied through input amplifier 10. Amplifier 77 may comprise an impedance follower configuration to provide a constant output impedance and suppression of switching transients for each memory cell 70 of the memory unit $M_1$.

Conventional solid-state techniques may be used to implement the logic circuitry illustrated in FIG. 2 for the storage cell 70. However, the requirements of high-speed operation and circuit complexity make microcircuit techniques generally preferable for most uses of the invention. Because of the desirable large size of storage capacitor 71, this component must generally comprise a discrete element. However, the remaining components of memory cell 70 can easily be implemented by integrated circuits.

A circuit embodiment of one such adaptation to integrated circuit techniques is illustrated in FIG. 3. The components which are illustrated by solid lines were fabricated as a two-chip integrated circuit. The components denoted by dashed lines in FIG. 3 are discrete components.

Analog switch 72 comprises a series switching transistor Q3 whose current-carrying terminals are interposed between the signal input from amplifier 60 and one terminal of the external storage capacitor 71. AND gate 73 includes two transistors Q1, Q2. The vertical write-in address signal is connected to the control terminal of transistor Q1 through a resistance 81 and the horizontal write-in address signal is connected to the control terminal of transistor Q2 through a resistance 82. The output of transistors Q1–Q2 is connected to the control terminal of transistor Q3 by a resistance 83, and a plurality of diodes 84 are connected in a feedback loop from resistance 83 to resistance 81 and 82. In operation, the inputs of transistors Q1 and Q2 must both have a high logic voltage thereon to provide current through resistance 83 to place series switching transistor Q3 in a conducting condition. Diodes 84 reduce the storage time of the AND gate 73 and provide a voltage clamp function for the AND gate 73.

Isolation amplifier 74 includes a uni-junction transistor Q4, and transistors Q5 and Q6. As noted, isolation amplifier 74 presents a high input impedance to storage capacitor 71 to prevent leakage of charge therefrom during the storage interval. A typical value for this input impedance is $10^{10}$ ohms or greater. The output impedance of amplifier 74, which is measured at the emitter of transistor Q6, is typically less than 0.1 ohm. Transistors Q4, Q5 and Q6, together with their associated coupling and biasing components 85–91, provide a closed-loop amplifier. A nominal open-loop gain for this amplifier is 125, whereas the closed-loop voltage gain is nominally 0.98. In this mode of operation, stable and linear operation is obtained which is relatively independent of component tolerances. External resistors 88 and 89 provide adjustment of the amplifier's offset voltage to allow precise offset matching of all memory cells within each memory unit. External capacitor 91 maintains a low output impedance at high frequencies.

Output analog switch 75 comprises a diode D1 connected between the emitter of transistor Q6 and the input terminal of amplifier 77, which comprises a transistor Q9 connected to an emitter-follower configuration. The sampled signal output provided to summing amplifier 160 appears at the emitter of transistor Q9. Control of the conduction state of diode D1 is by the AND gate 76 which includes transistors Q7 and Q8. The emitter of transistor Q8 is connected to the common terminal of diode D1 and transistor Q9 by means of resistances 93 and 94. The vertical read-out address signal is connected to the control terminal of transistor Q7 through a resistance 95, and the horizontal read-out address signal is connected to the control terminal of transistor Q8 through a resistance 96. A plurality of diodes 97 are connected from the common point of resistances 93 and 94 to resistances 95 and 96. The components comprising AND gate 76 operate in an identical manner to those comprising AND gate 73, but at a much faster rate. Accordingly, resistances 95 and 96 have a much lower value than resistances 81 and 82 to decrease the turn-on time of transistors Q7 and Q8 with respect to the turn-on times of transistorssQ1 and Q2. When transistors Q7 and Q8 are turned on, diode D1 becomes forward-biased to couple the analog signal stored on capacitor 71 to the signal output through transistor Q9. Resistance 92 may be common for all the memory cells 70 of the particular memory $M_1$ and, accordingly, may serve as the input resistance to amplifier 160.

Each of the memory cells constructed according to FIG. 3 was fabricated in a two-chip integrated circuit and individually packaged in a T0–101 microelectronic assembly. A plurality of these assemblies were then placed in a matrix arrangement on a five-layer memory board which provided for physical mounting, signal interconnection, address logic interconnection, reference voltage interconnection, and biasing voltage interconnection.

Figure 4:
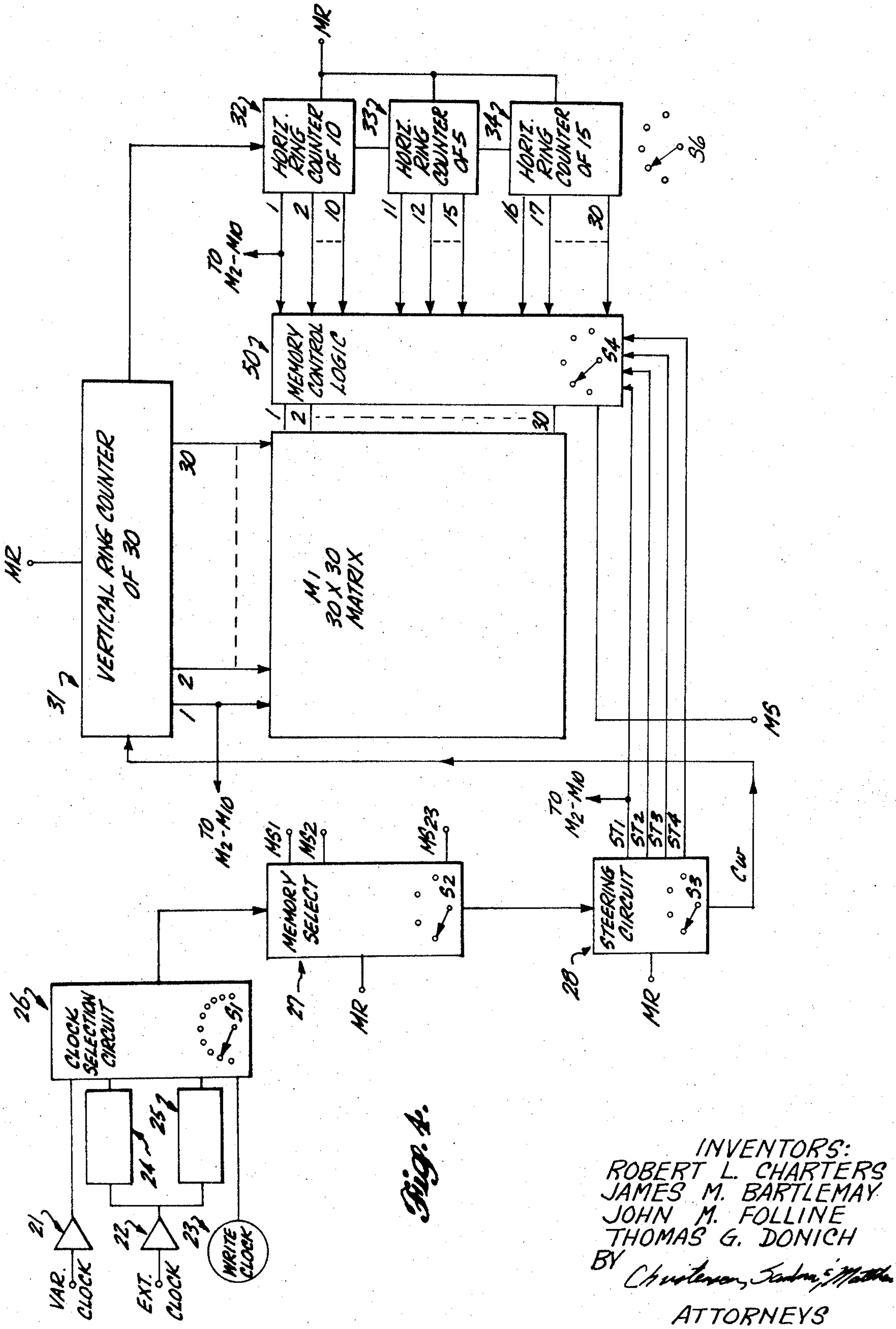
FIG. 4 is a block diagram of the write-in memory address logic.
Figure 5:
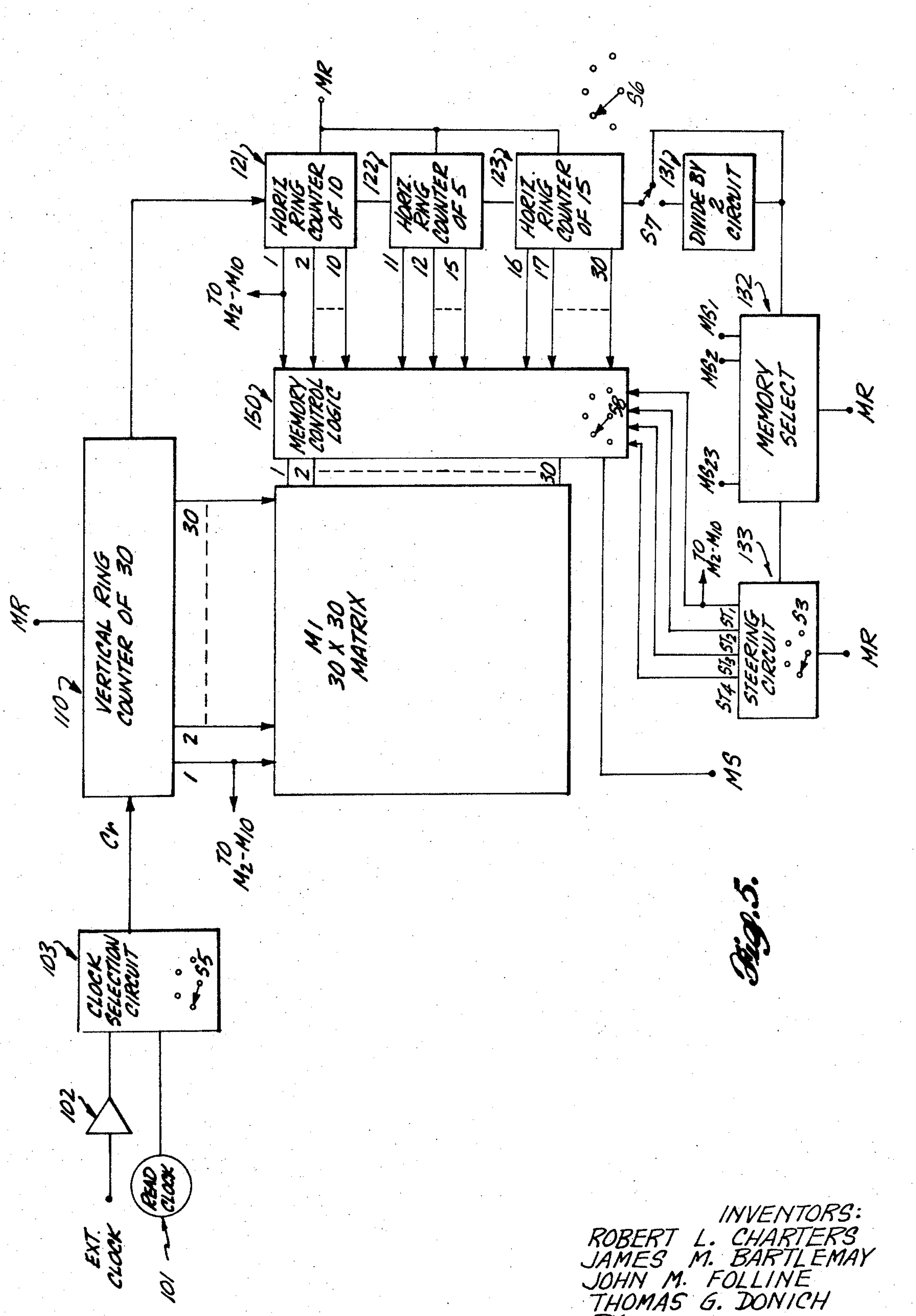
FIG. 5 is a block diagram of the read-out memory address logic.

Reference should now be made to FIGS. 4 and 5 for a more detailed description of one of the write-in and read-out address logic portions of the analog memory. The description should be considered also in conjunction with the timing diagrams of FIGS. 6–8.

In FIG. 4, a write clock and memory select circuit includes a clock selection circuit 26 which includes a switch S1. Three clock inputs are provided to clock selection circuit 26. The first is obtained from an external, variable-frequency clock source through an input amplifier 21. The second is obtained from an external, fixed frequency clock source through an input amplifier 22 and either a first multiplier circuit 24 or a second multiplier circuit 25. The third is obtained from an internal write clock 23. The output of clock selection circuit 26 is in turn coupled to memory select circuit 27. The function of clock selection circuit 26 is to provide a means for selecting the appropriate clock pulses from either the write clock 23 or the external clock inputs such that the pulses supplied to memory select circuit 27 have a predetermined repetition rate with respect to the number of MS pulses, and thus the width of each MS pulse, that will be produced by memory select circuit 27. Such an operation is necessary because it is desirable that the pulse repetition rate of the MS pulses be always constant. Clock selection circuit 26 accordingly includes a variable divider chain which is under control of switch S1. Circuits 24 and 25 are appropriate frequency multipliers whose multiplication factor may be chosen to allow operation of the analog memory with the various external clock sources.

Memory select circuit 27 provides 23 sequentially-occurring MS pulses $MS_1$–$MS_{23}$ on 23 separate output connections. Included in memory select circuit 27 is a control switch S2, a reset terminal MR and a flip-flop ring counter of 23 which may be switched to a ring of 23, 12, eight and six by the selector switch S2. Memory select circuit 27 also includes an output to a steering circuit 28 hereinafter to be described. This output is always maintained at the aforementioned constant pulse repetition rate. Thus, there will always be one output signal supplied to steering circuit 28 for every sequence of MS pulses. Since the number of MS pulses is controllable by switch S2, the MS pulse width is accordingly increased when the lower flip-flop rings are used.

In the embodiment of FIGS. 4 and 5, there are ten memory units $M_1$–$M_{10}$ in the analog memory. Each memory unit comprises a 30 × 30 matrix of the memory cells 70. The memory control logic 50 associated with each memory unit has an MS input terminal. Control of the write-in address sequence is chosen by connecting a coaxial connector from the MS terminal associated with the particular memory to the desired $MS_1$–$MS_{23}$ pulses from memory select circuit 27. Since there are but ten memory units, only ten of the $MS_1$–$MS_{23}$ pulses can be used. This provision of more MS pulses than can be used during the addressing sequence allows flexibility in varying the timing of the basic addressing sequence.

In the embodiment of FIG. 4, steering circuit 28 comprises a ring counter of four which may be switched to a ring of four, three, or two by a selector switch S3. Steering circuit 28 also includes a reset terminal MR. The outputs of the flip-flops in the ring counter are provided on four output terminals ST1–ST4, and the output of the last flip-flop in the ring is applied to the input of a vertical ring counter 31. In one mode of operation, S3 is set to provide a ring of 2 and steering circuit 28 provides pulses in the sequence ST1, ST2, ST1, etc., in response to each output pulse from memory select circuit 27. In this mode of operation, the clock pulses $C_w$ appearing on the output of steering circuit 28 occur for every two $ST_w$ pulses and thus every other output pulse from memory select circuit 27. The four output connections on which the ST1–ST4 pulses may appear are coupled to the memory control logic 50 of each memory $M_1$–$M_{10}$.

Vertical ring counter 31 comprises a ring of 30 flip-flops which are stepped in sequence in response to each $C_w$ pulse from steering circuit 28. The outputs appear as pulses V1, V2, . . . V30 on the output connections of ring counter 31 and are applied to each of the memory units $M_1$–$M_{10}$. The output of the last flip-flop in vertical ring counter 31 is applied to a set of horizontal ring counters 32, 33, and 34. Ring counter 32 comprises a ring of 10 flipflops, ring counter 33 a ring of five flip-flops, and ring counter 34 a ring of fifteen flip-flops. One output pulse is produced by vertical ring counter 31 for every thirty $C_w$ pulses applied thereto. In this manner, the basic write-in addressing sequence by proceeding down each horizontal row of the matrices is implemented. Separating the horizontal counter into three ring counters 32–34 allows portions of each memory to be operated in parallel, independent of the other. The connections between the ring counters 32–34 are such that, no matter what the combination of rings that is used, the various sets are always operated in synchronization with the pulses from vertical ring counter 31. A selector switch S6 permits operation in any of the following modes: first, ring counters 32, 33 and 34 operating in parallel in response to the pulses from vertical ring counter 31; second, ring counters 32 and 33 operating as a single ring of 15 and operating in parallel with ring counter 34, third, ring counters 33 and 34 operating as a single ring of 20 and operating in parallel with the ring counter 32; fourth, ring counters 32–34 operating together to form a single ring of 30. The outputs of ring counters 32–34 appear as pulses H1, H2, . . . H30 and are supplied to the memory control logics 50 of the memory units $M_1$–$M_{10}$. Both vertical ring counter 31 and horizontal ring counters 32–34 also have a reset input MR.

Each memory control logic circuit 50 includes a plurality of gate circuits that operate under control of a selector switch S4 to appropriately provide any desired combination of the input signals $H_1$–$H_{30}$, $ST_1$–$ST_4$, and the pulse appearing on the MS input thereto. Basically, each memory control logic circuit 50 is capable of dividing the memory unit associated therewith into as many sections as there are ST pulses from steering circuit 28. Each memory unit section may then be further subdivided by appropriately choosing the operational modes of ring counters 32–34. Finally, since memory control logic circuit 50 has the MS pulse connected thereto, it operates to provide a horizontal write-in address signal on its outputs only during the time when it is desired to address the memory unit associated therewith.

Any reset signals applied to reset terminals MR of memory select circuit 27, steering circuit 28, counter 31, and counters 32–34, provide for synchronization of the analog memory to external equipment. However, they are not necessary for correct operation of the memory. In addition, a sync output may be provided by these components to maintain the external equipment in step with the analog memory.

Figure 6:
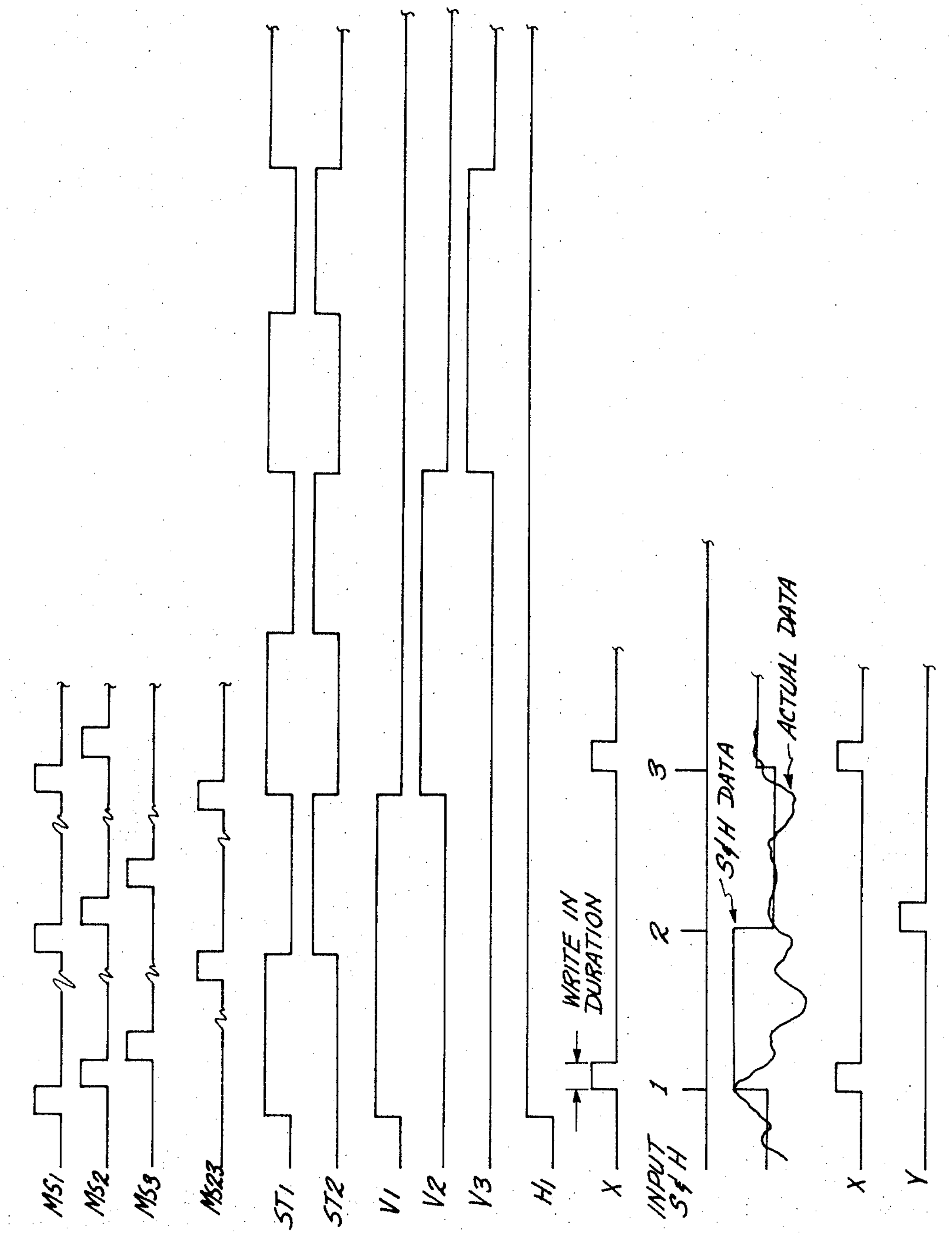
FIGS. 6, 7 and 8 are timing diagrams illustrating the operation of the address logics of FIGS. 4 and 5.
Figure 7:
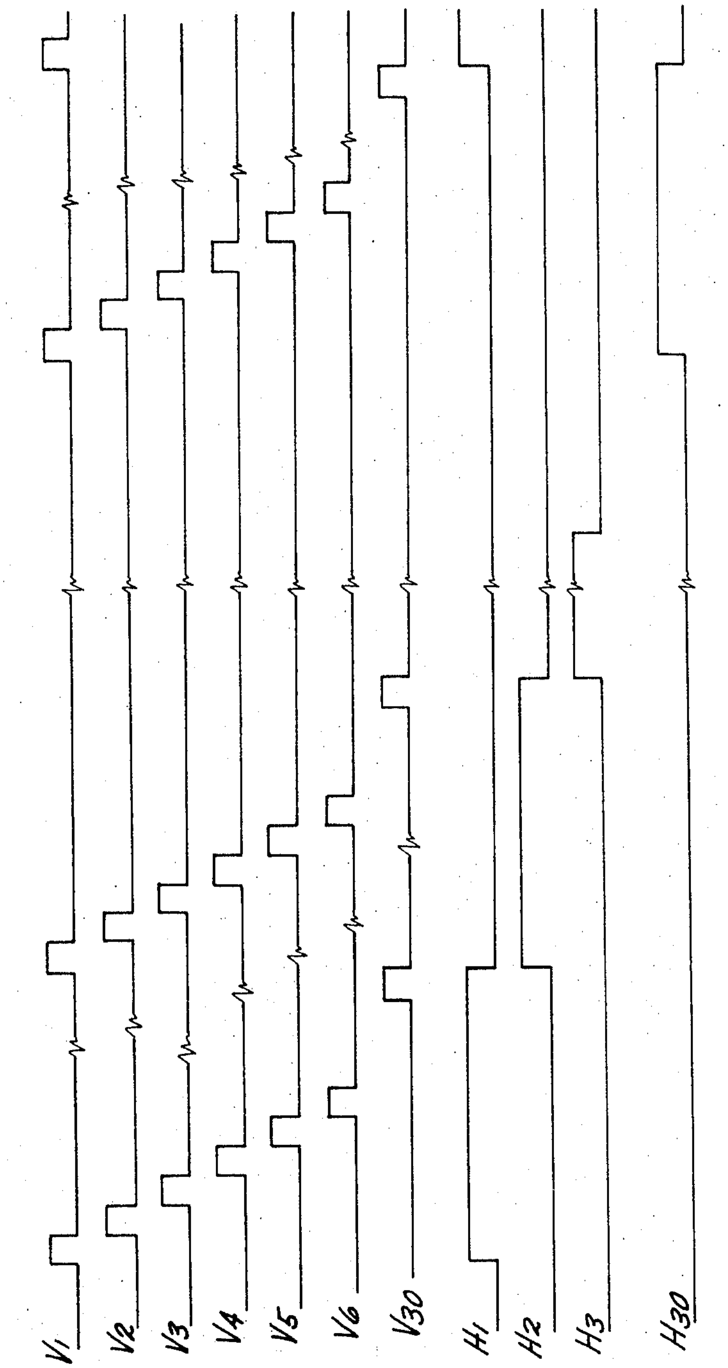

FIGS. 6 and 7 show a timing diagram for the write-in address logic portion illustrated in FIG. 4. In FIG. 6, the MS pulse is coupled to the input of memory control logic 50 associated with memory $M_1$. In addition, steering circuit 28 is set to provide a ring of two and, accordingly, $ST_1$ and $ST_2$ pulses are produced therefrom. $C_w$ pulses are thus produced for every two MS pulse groups, and, accordingly, for every two ST pulses from steering circuit 28. In this fashion, the vertical ring counter 31 is stepped every two MS pulse sequences to provide vertical write-in address pulses $V_1$, $V_2$, $V_3$, etc. During the sequence illustrated, the horizontal ring counters 32–34 are connected by switch S5 to operate in a ringe of 30, and output pulse $H_1$ is produced from ring counter 32. However, it will be noted that the pulse X which denotes the actual horizontal write-in address signal from memory control logic 50 appears only when the $MS_2$ and $ST_1$ pulses are also furnished to memory control logic 50. Accordingly, the actual write-in interval is determined by the duration of the X pulses. On the other hand, the input sample and hold circuit 40 associated with memory unit $M_1$ samples the analog input wave form for every $MS_2$ pulse. Thus, although the analog input wave form is sampled at every $MS_2$ pulse, the analog value stored in circuit 40 is written into memory unit $M_1$ only during the duration of the X pulses. The first X pulse illustrated will switch the cell 70 in position $m_{1,1}$ of memory unit $M_1$, and the second X pulse will switch the cell in position $m_{1,2}$.

As can be seen from FIG. 7, which is a compressed version of FIG. 6 illustrating only the outputs from vertical ring counter 31 and horizontal ring counters 32–34, this basic addressing sequence continues throughout the entire memory unit $M_1$. This basic addressing sequence will be identical for the remaining memory units $M_2$–$M_{10}$, but displaced in time by an amount determined by the width and spacing of the MS pulses.

If it is desired to separate the memory unit $M_1$ into two sections, memory control logic 50 associated therewith may be set to produce a Y pulse upon the occurrence of the $MS_2$ pulse, the $ST_2$ pulse, and any of the $H_{16}$–$H_{30}$ pulses, and to produce the X pulse upon the occurrence of the $MS_2$ pulse, $ST_1$ pulse and any of the $H_1$–$H_{15}$ pulses. In this mode of operation, data is written into one half of the memory unit $M_1$ at times corresponding to the occurrence of the $ST_1$ pulses, and into the remaining half at times corresponding to the occurrence of the $ST_2$ pulses.

The read-out address logic portion illustrated in FIG. 5 is quite similar to the write-in address logic portion of FIG. 4. The distinctions are mainly to provide much higher frequency of operation and to allow parallel as well as serial addressing of the memory cells 70 in the various memory units. Thus, read clock 100 includes a clock selection circuit 103 which has as inputs thereto an external, fixed-frequency clock source through an amplifier 102, and an internal read clock 101. A selector switch S5 in clock selection circuit 103 allows choice of the repetition rate of clock pulses $C_r$ therefrom. The frequency of these $C_r$ pulses determines the basic read-out rate of the memory units. The $C_r$ pulses step a vertical ring counter 110 which comprises a ring of 30 flip-flops providing output pulses $V_1$–$V_{30}$ to memory units $M_1$–$M_{10}$. The output of vertical ring counter 110 is applied to three horizontal ring counters 121, 122 and 123 which function in an identical manner to ring counters 32-34 of the write-in address logic portion. The outputs of these ring counters are applied to the memory control logic circuit 150 of each memory unit $M_1$–$M_{10}$. The switch S6 which controls the write-in horizontal ring counters 32–34 also controls the mode of operation of the read-out horizontal ring counters 121–123, so that write-in and read-out addressing always takes place in the same mode.

The output of horizontal ring counter 123 is applied to the input of a memory select circuit 132 by means of a switch S7, either directly, or through a divide-by-2 circuit 131. The function of switch S7 and divide-by-2 circuit 121 is to insure that the memory select circuit 132 is always supplied with pulses from the horizontal ring counter which have a constant repetition rate.

Memory select circuit 132 is similar to memory select circuit 27, but includes no provision for choosing a lower order of rings therein. Output pulses $MS_1$–$MS_{23}$ are provided which may be connected by appropriate coaxial connectors to the desired MS inputs of the various memory control logics 150. Normally, the sequence of read-out is the same as the sequence of write-in, and thus, if the $MS_1$ pulse of memory select circuit 27 is connected to the MS input of memory control logic 50 associated with memory unit $M_1$, then the $MS_1$ pulse from memory select circuit 132 will be connected to the MS input of memory control logic 150 associated with memory unit $M_1$.

The output of memory select circuit 132 is coupled to a steering circuit 133 which includes the selector switch S3 which controls the operation of steering circuit 28. Steering circuit 133 provides for $ST_r$ outputs $ST_1$–ST to the various memory control logics 150. Switch S3 sets the flip-flops in steering circuit 133 to produce the same mode of operation as the flip-flops in steering circuit 28.

Each memory control logic 150 includes a plurality of gate circuits that operate under control of a selector switch $S_8$ to appropriately provide any desired combination of the input signals $H_1$–$H_{30}$, $ST_1$–$ST_4$, and the $MS_r$ pulse appearing on the MS input thereto. The gate combinations are chosen to multiplex the outputs of memory units $M_1$–$M_{10}$ so that the sampled analog data stored in a particular write-in addressing sequence can be read out in an intelligible manner.

Figure 8:
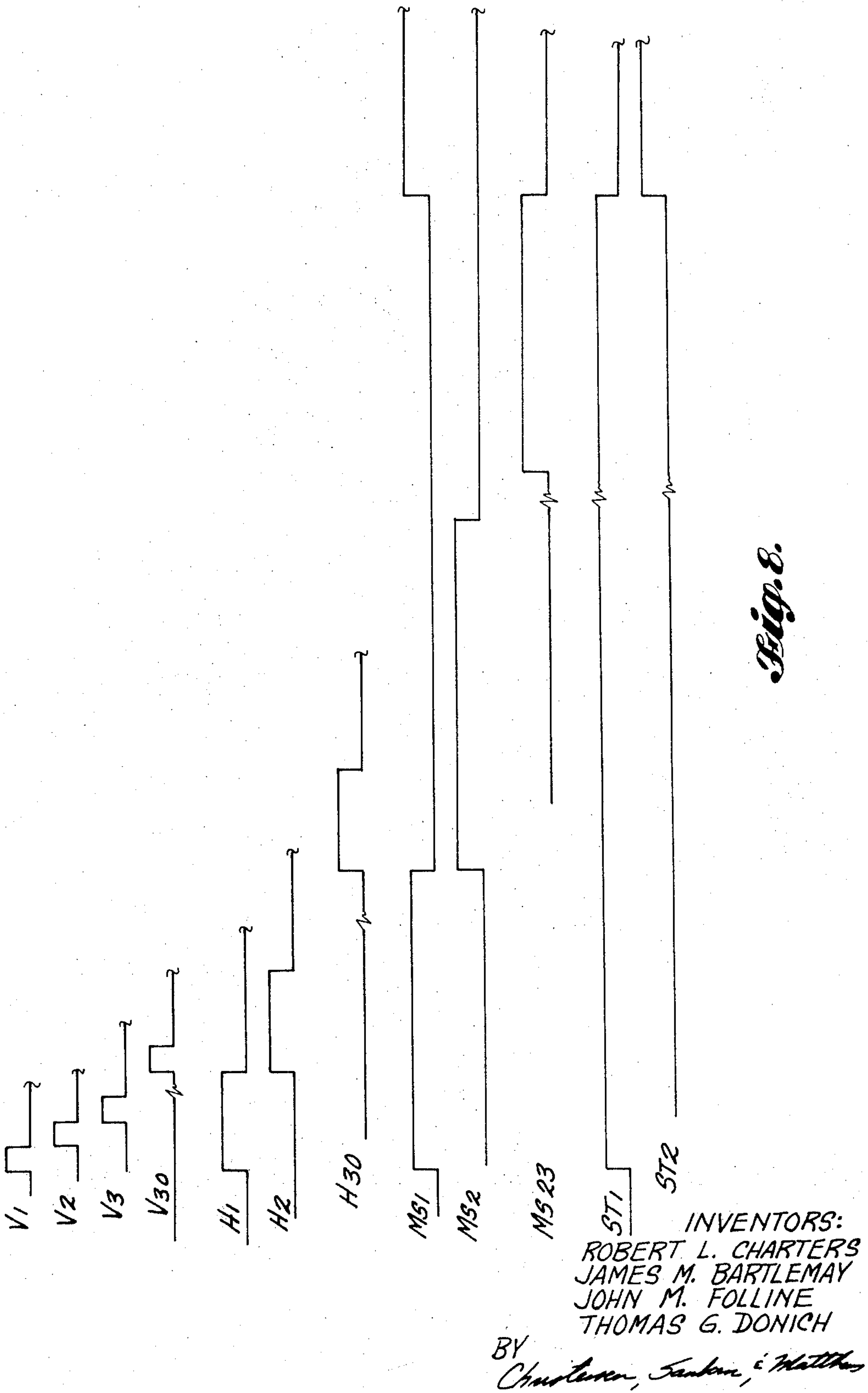

With reference now to the timing diagram of FIG. 8, it can be noted that the circuitry described provides sequential read-out of the entire contents of each memory unit $M_1$–$M_{10}$, or sections thereof, in a sequence determined by the connection of the $MS_1$–$_{MS23}$ pulses to the various memory control logics 150. Thus, in the simplest mode of operation, the entire contents of memory unit $M_1$ will be read out to the appropriate output sample and hold circuit 140 during pulse $MS_1$, the entire contents of memory unit $M_2$ during pulse $MS_2$, and so forth. If the write-in addressing sequence has been such that the memory unit $M_1$, for example, has been divided into two sections, each section comprising one-half of the memory unit or 15 horizontal rows of the matrix, then the $ST_1$ pulse may be appropriately gated with the $MS_1$ and $H_1$–$H_{15}$ pulses to read out the information in the first 15 horizontal rows during a first $MS_r$ pulse sequence, and the $St_2$ pulse could be gated with the $MS_1$ and $H_{16}$-$H_{30}$ pulses to provide read out of the second 15 horizontal rows during a second $MS_r$ pulse sequence.

Because of the much higher frequency of read out, delays occasioned by clocking a counter by the output of a preceding counter, r in the embodiment of FIG. 5, may cause timing problems because of their cumulative effect. For example, horizontal ring counters 121–123 are gated by the output of vertical ring counter 110, the counters in memory select circuit 132 from the output of horizontal ring counter 123, and steering circuit 133 from the output of memory select circuit 132. The propagation delays and switching times which accumulate from vertical ring counter 110 to steering circuit 133 may be sufficient to cause a loss of synchronism therebetween. In such a case, where extremely high read-out frequencies are desired, the $C_r$pulses may be gated with the output of each counter and the resultant gated pulse used to clock the next counter in the string.

The electronic analog capacitor memory of this invention thus provides independent write-in and read-out at selectively variable rates, by the use of separate write-in and read-out address logic portions. In addition, the invention may provide either serial or parallel write-in and read-out of data. Most important, the invention provides time compression of an input analog signal because write-in is carried out at a much lower rate than read-out. In one embodiment, the write-in sampling interval was 0.010 seconds, while the read-out interval was 100 microseconds. Such a time compression allows a large number of repetitive investigations of the analog data until a significant change has been made in the informational content. Finally, because of the use of analog, rather than digital memory techniques, the capacity and dynamic range of the memory is vastly increased with an equivalent number of memory elements, and the necessity of separate analog-to-digital and digital-to-analog conversion, a further limitation on dynamic range and storage capability, is eliminated.

What we claim:

1. An analog memory system comprising:

a. a memory unit including a plurality of memory cells, each of said cells comprising a sample and hold circuit having an input terminal, a write-in address terminal, a read-out address terminal, and an output terminal and including a first analog switch having signal and control inputs, and an output, means coupling said input terminal to said signal input of said first analog switch, first means coupling said write-in address terminal to said control input of said first analog switch, an energy storage means connected to the output of said first analog switch, a second analog switch having signal and control inputs, and an output, an isolation amplifier coupling said energy storage means to said signal input of said second analog switch, second means coupling said read-out address terminal to said control input of said second analog switch, and third means coupling said output of said analog switch to said output terminal, said sample and hold circuit being operative to sample an analog signal at its input terminal when a write-in control signal is supplied to its write-in address terminal, to store the sampled signal during any subsequent interval, and to present the sampled signal to its output terminal when a read-out control signal is supplied to its read-out address terminal, b. means coupling an analog signal to the input terminal of each memory cell, c. means summing the signals appearing on the output terminals of said memory cells to provide an output signal, d. write-in address logic means furnishing write-in control signals to said write-in address terminals of said plurality of memory cells at a relatively low repetition rate, and e. read-out address logic means furnishing read-out control signals to said read-out address terminals of said plurality of memory cells at a relatively high repetition rate.

2. The analog memory as recited in claim 1, wherein said first and second analog switches, said isolation amplifier, and said first and second coupling means of each sample and hold circuit comprise an integrated circuit, and said energy storage means includes a discrete capacitor connected thereto.

3. The analog memory as recited in claim 1 wherein:

a. said plurality of memory cells are arranged in a matrix of vertical and horizontal rows, b. said write-in control signals comprise vertical and horizontal write-in address signals, both of which must be supplied to each of said memory cells for said cell to sample data, wherein said first means coupling said write-in address terminal to said control input of said first analog switch in each of said sample and hold circuits comprises a first gating circuit, and c. said read-out control signals comprise vertical and horizontal read-out address signals, both of which must be supplied to each of said memory cells for said cell to output the sampled data, wherein each of said second means coupling said read-out address terminal to said control input of said second analog switch comprises a second gating circuit.

4. The analog memory as recited in claim 3 wherein said write-in address logic means includes:

a. a vertical ring counter producing said vertical write-in address signals and stepped at said relatively low repetition rate, and b. a horizontal ring counter producing said horizontal write-in address signals and stepped by said vertical ring counter, so that said matrix of memory cells is addressed in a sequential manner.

5. The analog memory as recited in claim 4 wherein said read-out address logic means includes:

a. a vertical ring counter producing said vertical read-out address signals and stepped at said relatively high repetition rate, and b. a horizontal ring counter producing said horizontal read-out address signals and stepped by said vertical ring counter, so that said matrix of memory cells is sequentially addressed for read-out.

6. The analog memory as recited in claim 3, further comprising:

a. a plurality of said memory units, each of said memory units having a single analog signal input terminal and a single sampled analog data output terminal, b. means coupling said analog signal to the analog signal input terminal of each of said memory units, c. a vertical ring counter and a horizontal ring counter included in said write-in address logic means, said vertical ring counter being stepped at said relatively low repetition rate and producing said vertical write-in address signals, said horizontal ring counter being stepped by said vertical ring counter and producing said horizontal write-in address signals, and d. means coupling the vertical and horizontal write-in address terminals of the corresponding memory cells in said plurality of memory units in parallel.

7. The analog memory as recited in claim 6, further comprising:

a. a vertical ring counter and a horizontal ring counter included in said read-out address logic means, said vertical ring counter being stepped at said relatively high repetition rate and producing said vertical read-out address signals, said horizontal ring counter being stepped by said vertical ring counter and producing said horizontal read-out address signals, and b. means coupling the vertical and horizontal read-out address terminals of the corresponding memory cells in said plurality of memory units in parallel.

8. The analog memory as recited in claim 7 wherein said first and second analog switches, said isolation amplifier and said first and second gating circuits of each said sample and hold circuit comprise an integrated circuit, and said energy storage means includes a discrete capacitor connected thereto.

9. The analog memory as recited in claim 7, further comprising:

a. counter means included in said write-in address logic means which produces a first series of pulses operative to step said vertical counter, and a second series of pulses which occur in a predetermined sequence in synchronism with said first series of pulses, b. a plurality of memory control logic means, each being interposed between said horizontal ring counter and one of said plurality of memory units, each additionally having a control input terminal and being operative to pass said horizontal write-in address signals upon the occurrence of a signal at said control input terminal, and c. means coupling one of said second series of pulses to the control input terminal of each of said plurality of memory control logic means so that the plurality of memory units are addressed for write-in in a predetermined sequence.

10. The analog memory as recited in claim 9 wherein:

a. said counter means produces a third series of pulses which occur at a repetition rate which is a multiple of the repetition rate of said first series of pulses, and b. each of said memory control logic means includes a second control input terminal therefor having said third series of pulses connected thereto, each of said memory control logic means being selectively operative to pass said horizontal write-in address signals in response to a predetermined combination of said pulses at the first and second control input terminals thereof.

11. The analog memory as recited in claim 9, wherein said analog signal coupling means includes:

a. a plurality of input sample and hold circuits each having an input terminal, a control terminal, and an output terminal, each of said input terminals being connected to said analog signal input, and each of said output terminals being connected to one of said plurality of memory units, b. each of said input sample and hold circuits being operative to sample said analog signal input for a period of time determined by the presence of a signal on its control input, and c. means coupling one of said second series of pulses to each control terminal of said plurality of input sample and hold circuits.

12. The analog memory as recited in claim 11, wherein each of said means coupling said second pulse series includes a monostable multivibrator.

13. The analog memory as recited in claim 9, further comprising:

a. a clock means included in said read-out address logic means which produces a fourth series of pulses operative to step said vertical counter in said read-out address logic means, b. a second counter in said read-out address logic means which is stepped by the output of said horizontal ring counter therein and which produces a fifth series of pulses which occur in a predetermined sequence in synchronism with the output pulses of said horizontal ring counter, c. a plurality of memory control logic means, each being interposed between said horizontal ring counter and one of said plurality of memory units, each additionally having a control input terminal and being operative to pass the horizontal read-out address signals upon the occurrence of a signal at said control input terminal, and d. means coupling one of said fifth series of pulses to the control input terminal of each of said plurality of memory control logic means so that the plurality of memory units are addressed for read-out in a predetermined sequence.

14. The analog memory as recited in claim 13, further comprising:

a. delay means having said fourth series of pulses connected thereto, b. a plurality of output sample and hold circuits, each of said circuits including an input terminal, an output terminal, and a control terminal, each of said input terminals being connected to the output terminals of a corresponding memory unit and each of said output terminals serving as an output terminal for the analog memory, c. each of said output sample and hold circuits being operative to sample the sampled analog data from its corresponding memory unit when a signal is present on its control input, and d. means coupling the delayed pulses from said delay means to the control terminals of each of said output sample and hold circuits.

15. The analog memory as recited in claim 13, wherein:

a. said second counter means produces a sixth series of pulses which occur at a given repetition rate, the repetition rate of said fifth series of pulses being a multiple of the repetition rate of said sixth series of pulses, and each of said memory control logic means in said read-out address logic means includes a second control input terminal having said sixth series of pulses connected thereto, each of said memory control logic means being selectively operative to pass said horizontal read-out address signals in response to a predetermined combination of said pulses at said first and second control input terminals thereof.

16. The analog memory as recited in claim 15 wherein said first and second analog switches, said isolation amplifier, and said first and second gating circuits of each said sample and hold circuit comprise an integrated circuit, and said energy storage means includes a discrete capacitor connected thereto.

* * * * *